(12) United States Patent  (10) Patent No.: US 8,210,129 B2
Jones  (45) Date of Patent: Jul. 3, 2012

(54) APPARATUS AND METHOD FOR AUTOMATICALLY DISPENSING A LIQUID

(76) Inventor: Forrest V. Jones, Monroe, NC (US)

( * ) Notice: Subject to any disclaimer, the term of this patent is extended or adjusted under 35 U.S.C. 154(b) by 169 days.

(21) Appl. No.: 12/674,848

(22) PCT Filed: Aug. 21, 2008

(86) PCT No.: PCT/US2008/009938
§ 371 (c)(1),
(2), (4) Date: Feb. 23, 2010

(87) PCT Pub. No.: WO2009/029195
PCT Pub. Date: Mar. 5, 2009

(65) Prior Publication Data
US 2011/0120385 A1    May 26, 2011

Related U.S. Application Data

(60) Provisional application No. 60/966,264, filed on Aug. 27, 2007.

(51) Int. Cl.
*A01K 13/00* (2006.01)

(52) U.S. Cl. ......... 119/601; 119/604; 119/666; 222/407

(58) Field of Classification Search .......... 119/601–604, 119/665–667, 75, 76; 222/406, 407; 4/602, 4/603; 239/208, 209
See application file for complete search history.

(56) References Cited

U.S. PATENT DOCUMENTS

| 37,923 | A | * | 3/1863 | Roe .................................. 119/76 |
| 211,874 | A | * | 2/1879 | Wasson ............................. 4/603 |
| 3,131,411 | A | * | 5/1964 | Mandy ....................... 15/250.02 |
| 3,173,402 | A | | 3/1965 | Cassel |
| 3,451,418 | A | | 6/1969 | Nakagawa et al. |
| 3,496,914 | A | * | 2/1970 | Cowan .......................... 119/667 |
| 3,602,199 | A | | 8/1971 | Diggs |
| 3,699,928 | A | * | 10/1972 | Cowan .......................... 119/667 |
| 3,916,453 | A | * | 11/1975 | Dominguez-Armada ........ 4/445 |
| 4,165,715 | A | * | 8/1979 | Knapp ............................ 119/666 |
| 4,542,547 | A | | 9/1985 | Sato |
| 4,829,609 | A | * | 5/1989 | Debrunner ........................ 4/603 |
| 6,520,118 | B2 | | 2/2003 | Swiegers et al. |
| 2002/0092481 | A1 | | 7/2002 | Spooner |
| 2005/0115515 | A1 | | 6/2005 | Dollar |
| 2009/0178626 | A1 | * | 7/2009 | Greeson ........................ 119/651 |

* cited by examiner

*Primary Examiner* — Kristen C Hayes
(74) *Attorney, Agent, or Firm* — K&L Gates LLP

(57) ABSTRACT

A method and apparatus for dispensing a liquid onto an object using the weight of the object, such as an animal, to compress the sides of an inflatable mat together to create a source of pressurized air that operates a pump to dispense liquid on to the object from a dispensing conduit.

19 Claims, 4 Drawing Sheets

US 8,210,129 B2

APPARATUS AND METHOD FOR AUTOMATICALLY DISPENSING A LIQUID

CROSS-REFERENCE TO RELATED APPLICATIONS

This application is entitled to the benefit of, and claims priority to, provisional U.S. Patent Application Ser. No. 60/966,264, filed Aug. 27, 2007, and entitled "Apparatus and Method for Automatically Dispensing A Liquid onto an Animal" the entirety of which is incorporated herein by reference.

BACKGROUND OF THE PRESENT INVENTION

The present invention relates generally to an apparatus and method for automatically dispensing a liquid onto an object, and more particularly to an improved apparatus and method which utilizes the weight of the object to automatically dispense the spray in a unique manner.

There are a number of situations in which it is desirable to spray an object with some type of liquid. For example, it is a known fact that flies, mosquitoes, worms and other vermin which land on cows can create stress and other irritations that can actually adversely affect the weight production of the cows. Accordingly, it is a known practice to spray the cow with some type of liquid that deals with this problem and improves the health and/or well being of the animal. However, it will be understood that there are other similar applications where it is desirable to spray other animals for other purposes, or to spray a liquid onto other objects (e.g. spray liquid cleaning fluids onto a vehicle. When the animal or other object is located at a remote location where electricity or power is not readily available (e.g. in a large pasture), the problem of spraying the animal or object is exacerbated because conventional power operated spraying equipment cannot be used, and/or because the equipment is not portable enough to be transported to the location of the animal.

It is known, for example, to provide automatic spraying of cattle and the like using the weight of the animal to actuate the spray mechanism. In these known devices, a pivoted plate is provided, and the cow is made to walk onto the pivoted plate and cause it to pivot downwardly under the weight of the cow. This downward movement of the plate is then used to actuate various types of mechanical linkages and the like which, in turn, mechanically pump the liquid onto the animal through adjacent nozzles. In many of these known devices, the apparatus is large, bulky, and relatively expensive to build, and in some cases the apparatus is in the form of a permanent installation that is not portable and/or must be power operated.

Typical apparatus of the foregoing type is disclosed, for example, in U.S. Pat. Nos. 3,602,199, 3,173,402, and 6,520,118.

While these known devices apparently result in a spray being automatically administered to an animal using the weight of the animal, the mechanisms for translating the weight of the animal to a pump for spraying the animal is usually somewhat complicated, relatively expensive, and in many cases not portable, all of which detract from the commercial viability of the devices.

In accordance with the present invention, a method and apparatus for automatically spraying an object, such as an animal, using the weight of the object is provided, and it is simple in construction and operation, relatively inexpensive to produce, and readily portable so that it can be used in remote locations, if desired.

SUMMARY OF THE INVENTION

Figure 1:
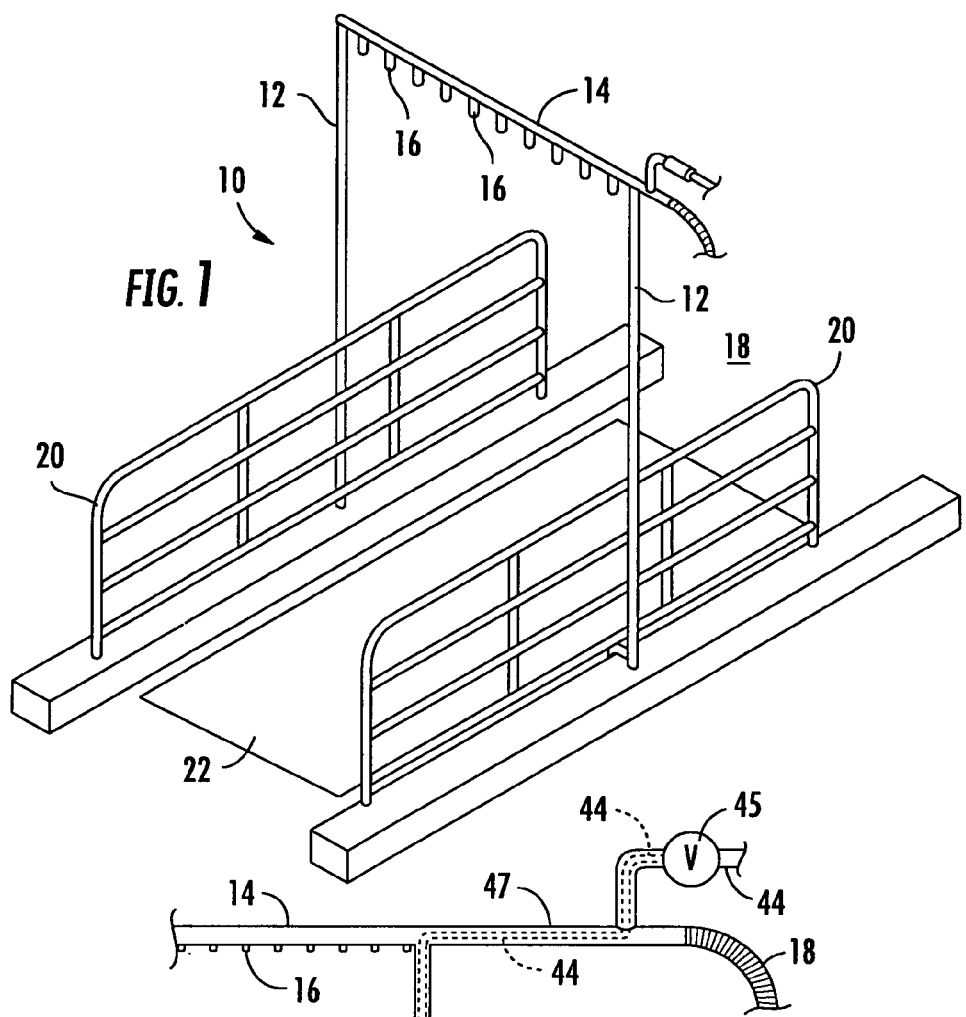
FIG. 1 is a perspective view of one embodiment of the present invention.

An apparatus for dispensing liquid comprising a conduit having at least one opening for dispensing liquid therefrom; a supply of liquid; a pressurized air actuated pump connected to the liquid supply and to the dispensing conduit for pumping liquid from the liquid supply and into the dispensing conduit; and a supply of pressurized air for actuating the pump comprising an inflatable mat having opposite side walls upon which an object can be placed and being comprised of at least one compartment, the mat having an air inlet through which air can flow into the mat and an pressurized air outlet connected to the pump, whereby air can be introduced into the mat through the inlet opening and discharged from the mat through the outlet opening to actuate the pump, and biasing means in the at least one compartment for urging the opposite side walls of the mat in a direction away from one another, whereby when the object is disposed on one of the side walls of the mat the weight of the object will compress the opposite side walls against the biasing means and whereby the opposite side walls will move toward one another to force pressurized air through the air outlet to the pump to actuate the pump and discharge liquid from the dispensing conduit.

Preferably, the mat includes a plurality of compartments positioned adjacent one another in series, and at least one one-way check valve is located between adjacent pairs of compartments so that air will flow in one direction from one compartment to another in the series. And, the plurality of compartments may include a first compartment at one end of the mat and a second compartment at the other end of the mat, and wherein the inlet opening and a one-way check valve are located in the first compartment and wherein the outlet opening and a one-way check valve are located in the second compartment. In the preferred embodiment of the present invention, the mat has at least three compartments extending side by side in longitudinally parallel relationship to one another.

The mat may be positioned beneath the dispensing conduit at a position that permits the object to move across the one of the side walls of the mat in a direction perpendicular to the axes of the compartments so that when the pump is actuated by the weight of the object, the dispensing conduit dispenses liquid onto the object. The object that is sprayed with liquid may be an animal.

The present invention also provides a method of dispensing a liquid onto an object using the weight of the object to dispense the liquid, the method including the steps of:

(a) providing a conduit having at least one opening for dispensing liquid therefrom;

(b) supplying liquid to the dispensing conduit from a supply of liquid using a pressurized air actuated pump; and (c) creating a source of pressurized air to actuate the pump by causing the object to be disposed on one a side wall of an inflated mat and causing the weight of the object to compress the mat and discharge pressurized air from the mat to the pump, and creating a vacuum within the mat by moving the walls of the mat away from one another when the weight of the object is removed from the mat whereby air can flow into the mat though an air inlet opening.

In the preferred method, the mat includes a plurality of compartments, and the step of creating a source of pressurized air includes causing air to flow in one direction from one compartment to another in series and be discharged through an outlet opening when the weight of the object moves the walls of at least one compartment toward one another, and the step of creating a vacuum in the series of compartments preferably includes using a biasing member to move the walls of at least one compartment away from one another when the weight of the object is removed from the mat to cause air to be drawn into the mat through the inlet opening.

The method may include the step of locating the mat beneath the dispensing conduit and causing the liquid to be dispensed onto the object. The object sprayed may be an animal, and the method may include the step of locating the mat in a confined pathway and causing the animal to move through the pathway and across one of the walls of the mat.

The mat may be formed of a plurality of compartments extending side by side in longitudinally parallel relation to one another, and the step of creating a source of pressurized air includes moving the object the object across the mat in a direction perpendicular to the longitudinal axes of the compartments to cause air to be discharged from a compartment at one end of the mat and to cause air to be drawn into the mat in a compartment at the opposite end of the mat.

DESCRIPTION OF THE PREFERRED EMBODIMENTS OF THE PRESENT INVENTION

Looking now in greater detail at the accompanying drawings, FIG. 1 illustrates apparatus 10 that is utilized to automatically dispense a spray of liquid onto an object. One particularly advantageous uses of the apparatus and method of the present invention is to dispense a medicinal liquid directly onto an animal for purposes described above, and that application is described herein as the preferred embodiment of the present invention. However, it is to be understood that the apparatus and method of the present invention can have a wide variety of application as to other objects. For example, and without limitation, the object could be a human, and the spray could be used as a shower for bathing at remote locations, or the object could be a vehicle with the spray being used to clean the vehicle or add wax to the vehicle.

Figure 2:
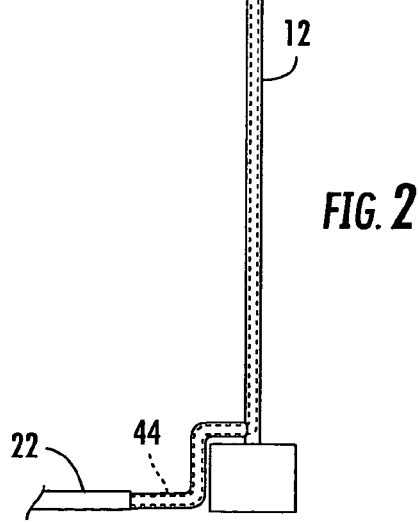
FIG. 2 is a side view of the stanchion in the apparatus illustrated in FIG. 1.

In the illustrated embodiment of the present invention wherein the object would be an animal such as a cow, there are two support stanchions 12 which extend vertically from the ground, and which support a dispensing conduit 14 which is provided with a plurality of spray nozzles 16. In the embodiment illustrated in FIGS. 1 and 2, the nozzles 16 are arranged to extend in a generally horizontal pattern located above the location where spray is to be applied to the animal as will be described in greater detail below, but it is to be understood that the particular arrangement of the nozzles themselves can vary substantially, depending on the application of the present invention. For example, it may be desirable in many applications to include one or more conduits 14 that extend vertically (not shown), so that the nozzles 16 in these conduits will dispense a spray in a vertical pattern, either alone or in combination with the horizontally extending conduit 14 and its nozzles 16, or the conduit 14, rather than be straight as illustrated in FIGS. 1 and 2, could be formed in a predetermined pattern (not shown).

As best seen in FIG. 1, a pathway 18 is provided beneath the array of nozzles 16 so that cows or other animals can be sprayed as they pass through the passageway 18 as will be described in greater detail below. In the disclosed embodiment of the present invention, only one pathways 18 are provided, and it is formed between optional divider panels 20, but it will be understood that any number of pathways 18 and accompanying spraying equipment can be utilized in any particular installation of the present invention.

A mat 22 is provided in the pathway 18, and the mat 22 normally will be placed on the ground beneath the nozzles 16. The mat 22 is preferably formed with an outer cover of a material that will withstand the wear and tear that will normally be expected from cattle passing over the outer surface of the mat, and the material must also be sufficiently resilient to permit compression and extension of the mat as will be described in greater detail below. While it will be understood that there are a number of materials from which the mat can be made to meet the specifications of the disclosed embodiment of the present invention, one typical example of a material is a mat 22 having an outer cover made of a heavy-duty rubber with a textured finish 24 that provides non-slip characteristics for the surfaces of the opposite side walls 36 and 38 of the mat 22.

Figure 3:
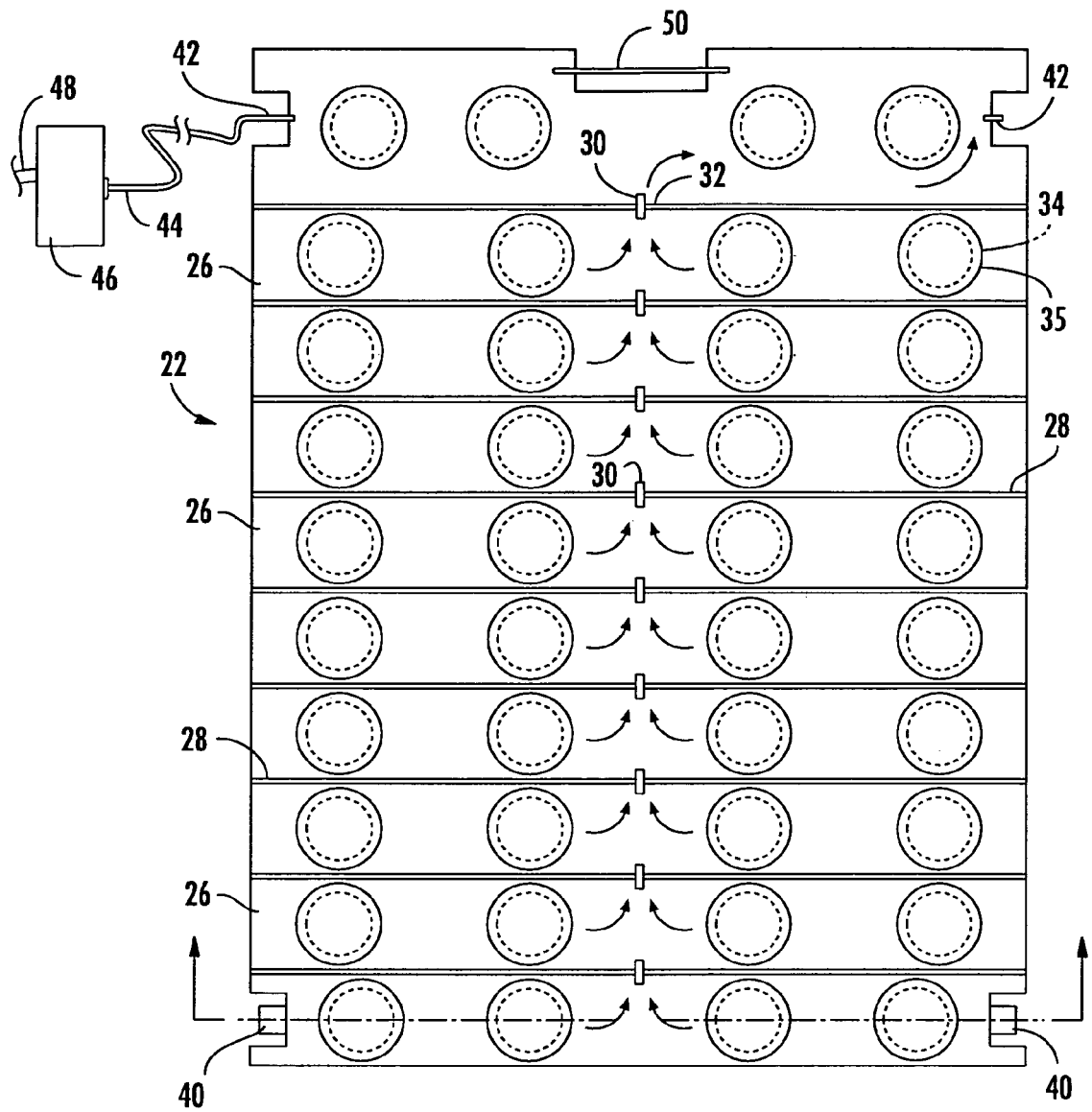
FIG. 3 is a plan view of a typical mat that is utilized in connection with the present invention.
Figure 4:
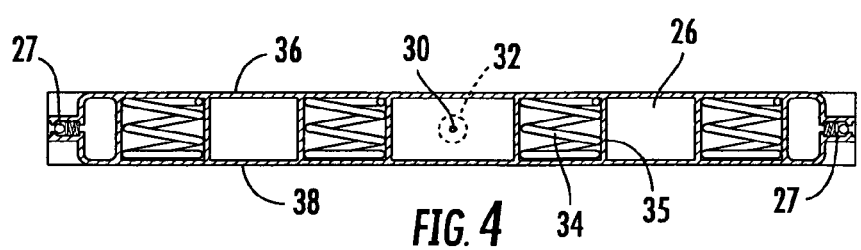
FIG. 4 is a vertical section view taken through the mat illustrated in FIG. 3.

As best seen in FIGS. 3 and 4, the mat 22 preferably has a generally rectangular shape, and it is divided into a plurality of individual compartments 26. Each compartment is separated from the other by parallel walls 28, and each wall 28 is provided with a one-way check valve 30 that is preferably mounted in the wall using washers 32 that hold the check valves 30 in the walls 28. Additionally, each of the compartments 26 is provided with a plurality of coil springs 34 mounted in resilient cylindrical casings 35 that extend between the upper side wall 36 of the mat 22 and the lower side wall 38 of the mat 22 to urge the opposite side walls 36, 38 in a direction away from one another, all is best seen in FIG. 4. While the preferred embodiment of the present invention utilizes coil springs 34 to urge the side walls 36, 38 in a direction away from one another, other equivalent biasing members could be used, such as solid rods of resilient material extending between the side walls 36, 38, or the material of the mat 22 can be selected and formed of a resilient but firm rubber-like material that that is flexible enough to permit the side walls 36, 38 to be moved toward one another when the weight of an object is applied to one of the side walls 36, 38 and that normally has a "memory" that will cause the side walls 36, 38 to be disposed in spaced relation to one another when to weight is applied to the side walls 36, 38.

One of the end compartments 26, such as the compartment which is located at the bottom of FIG. 3, is provided with an inlet conduit 40 through which fluid, preferably air, can be introduced into the mat 22. And this inlet conduit preferably includes a conventional check valve 27 that prevents the air from flowing back out through the inlet conduit 40. Similarly, in the compartment 26 at the other end of mat 22, which is the uppermost compartment 26 as illustrated in FIG. 3, outlet conduits 42 are provided and they may also have conventional one way check valves (not shown) that are identical to check valves 27 described above and arranged to permit air to flow only outwardly from the uppermost compartment 26 in a manner to be described below. A connecting conduit 44 may be connected to either one of the outlet conduits 42, and the connecting conduit 44 extends to a conventional pressurized air actuated pump 46, which is diagrammatically illustrated in FIG. 3. One pressure activated pump which is suitable for use in the present invention is a five gallon tank unit manufactured and sold by Salvarani North America, Inc. in Montreal, Canada under its Part No. 350011. Another connecting conduit 50 extends from the pump 46 to the dispensing conduit 14 to be in fluid communication therewith (see FIG. 2). If desired, the pump 46 can be provided with a conventional pressure valve (not shown) for monitoring and regulating the pressure of the liquid supplied by the pump 46 to the conduits 14, and, if desired, the mat may be provided with a rod 50 that extends across an opening formed in one of the compartments 26. This rod 50 can be utilized as a handle to assist in moving the mat 22 from one location to another, thereby making it very portable. Alternatively, the outer cover of the mat 22 may be formed with one or more grommets (not shown) or similar openings that can provide a connection point for receiving cables or the like for transporting the mat 22.

As best seen in FIG. 2, a combined inlet and outlet conduit 47 extends coaxially with the dispensing conduit 14 in fluid communication therewith. The connecting conduit 44 that extends from the outlet conduit 42 of the mat 22 extends into the lower end of one of the stanchions 12 and upwardly through the center of the stanchion 12, and it is located telescopically within the center of a combined inlet and outlet conduit 47 to extend horizontally therethrough, and to extend ultimately to the pump 46 (see FIG. 3), which may be located at any convenient position relative to the mat 22 and the combined inlet and outlet conduit 47. The connecting conduit 44 may have a control valve 45 therein. The connecting conduit 48 from the pump 46 is connected directly to the combined-inlet and outlet conduit 47 (see FIG. 2) so that liquid pumped from the pump 46 can flow through the spacing within the combined inlet and outlet conduit 47 between its inner wall the outer wall of the outlet conduit 42, and directly into the dispensing conduit 14 to be dispensed through the nozzles 16.

The air passing into the mat 22 through the inlet conduits 40 may be either ambient air or compressed air, depending on the application of the present invention. In some applications where relatively low air pressure is required, the above-described vacuum created by the movement of the opposite side walls 36 and 38 away from one another under the bias of the springs 34 will be sufficient to draw in ambient air, and relatively low pressure air discharged to the pump 46 when the mat is compressed by the weight of an object will be sufficient to dispense at least a small amount of liquid through the nozzles 16. In other applications where greater pressures are required, the inlet conduits 40 may be connected to any convenient source of compressed air (not shown). The mat 22 will be designed to accommodate higher pressures and to discharge air at increased pressures to operate the pump 46, depending on the application of the present invention.

In operation, the coil springs 34 in FIG. 1 will initially move the side walls 36 and 38 away from one another and create a vacuum within the interior of the mat 22. Air will then flow into the mat 22 through one or both of the inlet conduits 40 to inflate the mat 22. Each of the compartment check valves 30 will have a low threshold pressure that will permit pressurized air to flow from one compartment 26 to an adjacent compartment 26 whenever there is a pressure differential between adjacent compartments. Therefore, as air is introduced into the lowermost compartment 26 as illustrated in FIG. 3, the air will gradually flow through the various check valves 30 until all of the compartments 26 are filled with air, and the pressure in all of the compartments 26 will be approximately the same. After the mat 22 is filled with air in this manner, or filled with compressed air as described above, the mat 22 will be placed on the ground in the passageways 20 as illustrated in FIG. 1, and the pump 46 will be connected to the mat 22 at one of the outlet conduits 42, and the pump will also be connected to the conduits 14 using the outlet conduit 48 from the pump 46, all as explained above.

Accordingly, when an animal, such as a cow, passes through the pathway 18, the animal must obviously step on the mat 22 located on the ground in that pathways 18, and the weight of the animal will compress the compartments 26. This compression of the compartments 26 will cause the air within the mat to flow in one direction only through the several compartments 26, and then outwardly through the uppermost compartment 26 as illustrated in FIG. 3 and through the outlet conduit 42. This pressurized air then goes to the pump 46 through the connecting conduit 44, and the liquid within the pump 46 is discharged from the pump 46 through the connecting conduit 48 to the dispensing conduit 14 and dispensed through the nozzles 16 directly onto the animal in the pathway 18. When the animal clears the pathway 18 and moves off of the mat 22, the coil springs 34 will urge the opposite side walls 36, 38 of the mat 22 away from one another so that it will assume its original configuration, and vacuum created in the mat 22 will cause air to flow into the mat 22 through the inlet conduit 40, as described above.

It will be apparent that the present invention provides a very simple, inexpensive, and extremely portable apparatus which can be placed at any desired position where animals or other objects to be sprayed are located, and it utilizes a specially designed inflatable mat 22 which is very inexpensive, simple and lightweight for converting the weight of the animal or other object to a source of fluid pressure that can be used to dispense a liquid through the nozzles 16 in a very simple manner as compared with the complicated and expensive mechanical arrangements disclosed in the prior art as described above. Another significant advantage of the present invention is that its simplified construction lends itself to portability. The few conduits needed for the air and liquid flow can be lengths of lightweight PVC pipe that can be connected together in the field and the lightweight mat 22 is easily transported and easily connected to the connecting conduit 44. Therefore, if cows, or other objects, are located at remote locations where there is no power or electricity, the entire system of the present invention can be easily transported to the remote location and quickly set up for use.

Figure 5:
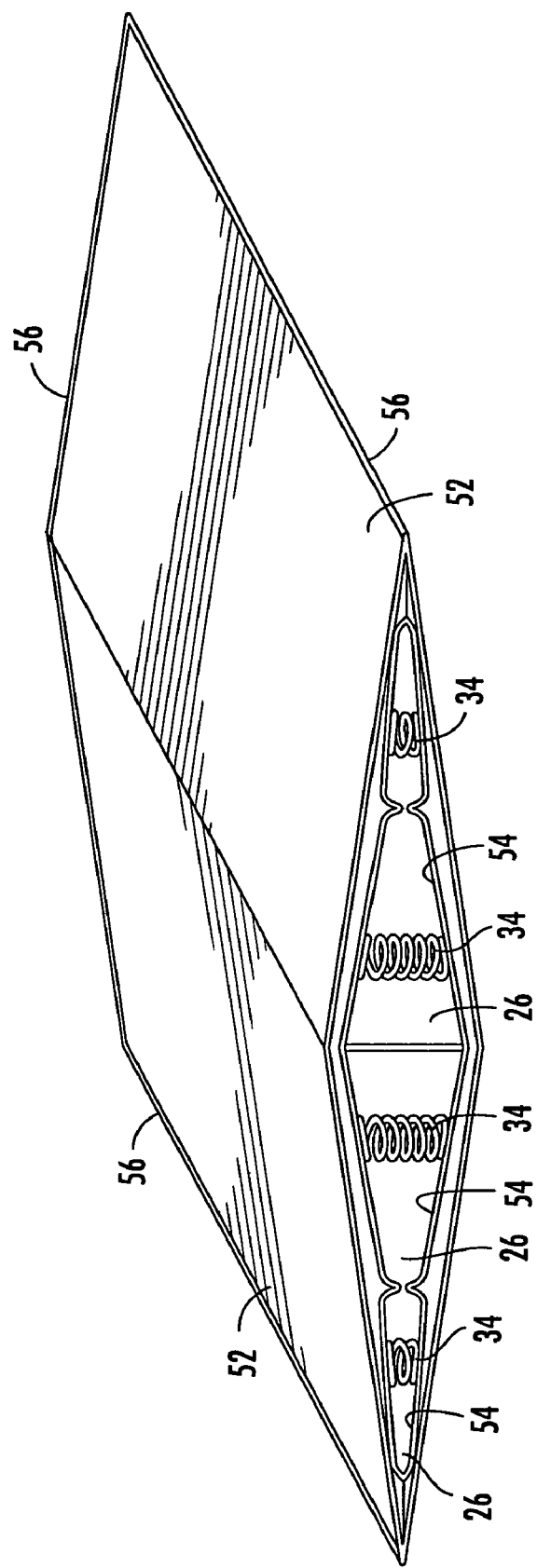
FIG. 5 is a diagrammatic view of an alternate embodiment of the mat of the present invention.

An alternate embodiment of the mat 22 is illustrated diagrammatically in FIG. 5. In this embodiment, the mat 22 has a two-part construction that includes an outer cover 52 that is made of a rugged, heavy duty material that is textured to provide a non-slip outer surface, and the cover 52 is formed of overlapping top and bottom pieces stitched together along the side edges 56 of the overlapping pieces. One or more bladders 54 are formed of a lighter more resilient material, such as rubber or the like, and the bladders 54 are contained within the outer cover 52 to provide the above-described compartments 26. The bladders 54 may, if desired, be of different sizes and/or configurations.

Figure 6:
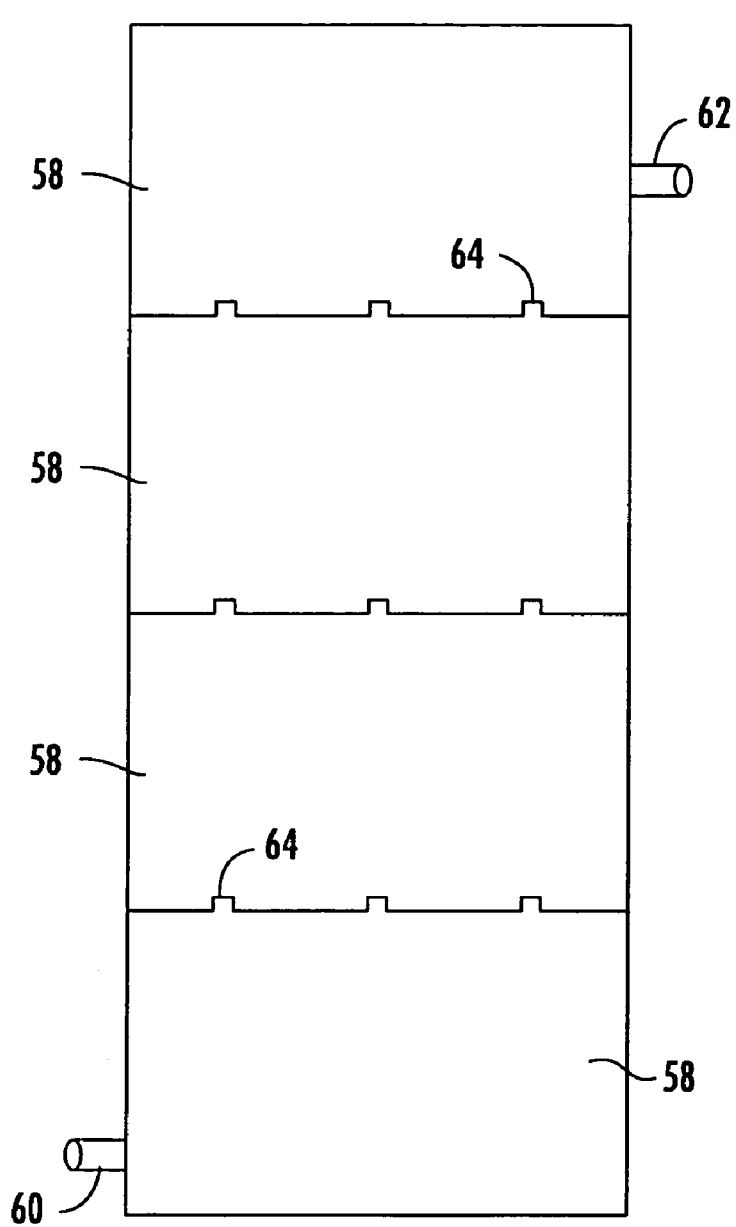
FIG. 6 is a plan view of another alternate embodiment of the mat of the present invention.
Figure 7:
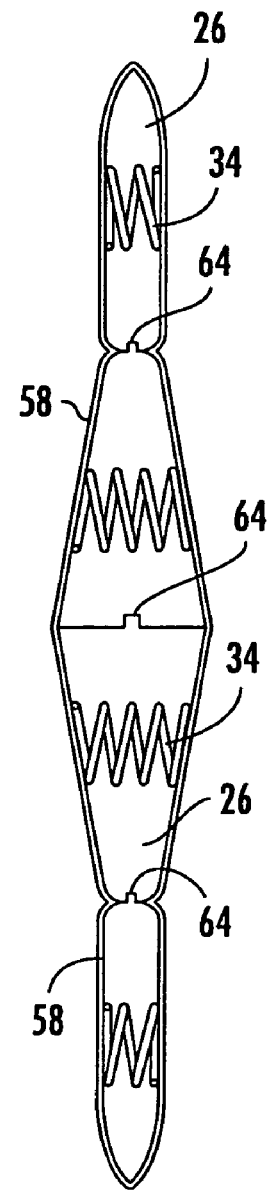
FIG. 7 is sectional view taken through the center of the mat illustrated in FIG. 6.

Another alternate embodiment of the mat 22 is diagrammatically illustrated in FIGS. 6 and 7. In this embodiment, the mat is made up of a plurality of bladders 58 made from a resilient material, and one of the bladders 58 includes an inlet conduit 60 having a one way check valve (not shown) therein, and an outlet conduit 62 having a one-way check valve therein (not shown). The plurality of bladders 58 have one way check valves 64 operating between adjacent bladders 58 in the same manner as the one way check valves 30 described above in connection with the first embodiment described above.

In view of the aforesaid written description of the present invention, it will be readily understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

What is claimed is:

1. An apparatus for dispensing liquid comprising:
   (a) a conduit having at least one opening for dispensing liquid therefrom;
   (b) a supply of liquid;
   (c) a pressurized air actuated pump connected to the liquid supply and to the dispensing conduit for pumping liquid from the liquid supply and into the dispensing conduit; and
   (d) a supply of pressurized air for actuating the pump comprising an inflatable mat having opposite side walls upon which an object can be placed and being comprised of at least one compartment, the mat having an air inlet through which air can flow into the mat and a pressurized air outlet connected to the pump, whereby air can be introduced into the mat through the inlet opening and discharged from the mat through the outlet opening to actuate the pump, and biasing means associated with at least one compartment for urging the opposite side walls of the mat in a direction away from one another, whereby when the object is disposed on one of the side walls of the mat the weight of the object will compress the opposite side walls against the biasing means and whereby the opposite side walls will move toward one another to force pressurized air through the air outlet to the pump to actuate the pump and discharge liquid from the dispensing conduit.

2. An apparatus for dispensing a fluid as defined in claim 1, wherein the mat includes a plurality of compartments positioned adjacent one another in series, and wherein at least one one-way check valve is located between each adjacent pair of compartments, whereby air can flow in one direction from one compartment to the other in the series.

3. An apparatus for dispensing a fluid as defined in claim 2, wherein the plurality of compartments include a first compartment at one end of the mat and a second compartment at the other end of the mat, and wherein the inlet opening and a one-way check valve are located in the first compartment and wherein the outlet opening and a one-way check valve are located in the second compartment.

4. An apparatus for dispensing a fluid as defined in claim 2, wherein the mat is positioned beneath the dispensing conduit whereby when the pump is actuated by the weight of the object, the dispensing conduit dispenses liquid onto the object.

5. An apparatus for dispensing a fluid as defined in claim 2, wherein the biasing means includes at least one compression spring disposed between the opposite side walls of the mat.

6. An apparatus for dispensing a fluid as defined in claim 2, wherein the mat has at least three compartments extending side by side in longitudinally parallel relationship to one another, wherein the outlet conduit is located in the compartment at one end of the mat, and wherein the inlet conduit is located in the compartment at the opposite end of the mat.

7. An apparatus for dispensing a fluid as defined in claim 6, wherein the mat is located beneath the dispensing conduit at a position that permits the object to move across one of the side walls of the mat in a direction perpendicular to the longitudinal axes of the plurality of compartments.

8. An apparatus for dispensing a fluid as defined in claim 7, wherein the mat is positioned in a pathway through which an animal can be made to pass, and wherein the object is an animal.

9. An apparatus for dispensing a fluid as defined in claim 1, wherein the mat is filled with ambient air when it is inflated.

10. An apparatus for dispensing a fluid as defined in claim 1, wherein the mat is filled with compressed air when it is inflated.

11. An apparatus for dispensing liquid onto an animal comprising:
    (a) a passageway through which the animal can walk;
    (b) a conduit located above the passageway and having at least one opening for dispensing liquid therefrom;
    (c) a supply of liquid;
    (d) a pressurized air actuated pump connected to the liquid supply and to the dispensing conduit for pumping liquid from the liquid supply and into the dispensing conduit; and
    (e) a supply of pressurized air for actuating the pump comprising an inflatable mat having a plurality of compartments forming opposite side walls over which the animal can walk and extending side by side in longitudinally parallel relationship to one another, one of the compartments at one end of the mat having an air inlet opening with a one-way check valve therein through which air can flow into the mat, and another of the compartments at the other end of the mat having a pressurized air outlet with a one-way check valve therein connected to the pump, and at least one one-way check valve located between each two adjacent compartments whereby air can be introduced into the mat through the inlet opening and discharged from the mat through the outlet opening to actuate the pump, and at least one biasing member in the at least one compartment for urging the opposite side walls of the mat in a direction away from one another, whereby when the animal walks onto the mat the weight of the animal will compress the biasing member in the at least one compartment and the opposite side walls in such compartment will move toward one another to force pressurized air through the air outlet to the pump to actuate the pump and discharge liquid from the dispensing conduit onto the animal, and whereby when the animal walks off the mat the biasing member will move the side walls of the compartment away from one another and create a vacuum within the mat to draw air into the mat through the air inlet opening.

12. A method of dispensing a liquid onto an object using the weight of the object to dispense the liquid, the method including the steps of:
    (a) providing a conduit having at least one opening for dispensing liquid therefrom;

(b) supplying liquid to the dispensing conduit from a supply of liquid using a pressurized air actuated pump; and (c) creating a source of pressurized air to actuate the pump by causing the object to be disposed on one of two opposite a side walls of an inflatable mat and causing the weight of the object to compress the mat and discharge pressurized air from the mat to the pump, and moving the side walls of the mat away from one another when the weight of the object is removed from the mat whereby air can flow into the mat though an air inlet opening.

13. A method of dispensing a liquid as defined in claim 12, wherein the mat includes a plurality of compartments, and wherein the step of creating a source of pressurized air includes causing air to flow in one direction from one compartment to another in series and be discharged through the outlet opening when the weight of the object moves the opposite side walls of at least one compartment toward one another, and creating a vacuum in the series of compartments using a bias to move the walls of at least one compartment away from one another when the weight of the object is removed from the mat to thereby cause air to be drawn into the mat through the inlet opening.

14. A method of dispensing a liquid as defined in claim 12, wherein the method includes the step of locating the mat beneath the dispensing conduit, and causing the liquid to be dispensed onto the object.

15. A method of dispensing a liquid as defined in claim 14, wherein the object is an animal, and wherein the step of creating a source of pressurized air includes locating the mat in a confined pathway, and causing the animal to move through the pathway and across one of the walls of the mat.

16. A method of dispensing a liquid as defined in claim 12, wherein the mat is formed with a plurality of compartments extending side by side in longitudinally parallel relationship to one another, and wherein the step of creating a source of pressurized air includes moving an object across the mat in a direction perpendicular to the longitudinal axes of the compartments to cause pressurized air to be discharged from the mat through a compartment at one end of the mat, and to cause air to be drawn into the mat through a compartment at the opposite end of the mat.

17. A method of dispensing a liquid onto an animal using the weight of the animal to dispense the liquid, the method including the steps of:

(a) providing a pathway through which the animal can walk;

(b) locating a conduit having at least one opening for dispensing liquid therefrom above the pathway;

(c) supplying liquid to the dispensing conduit from a supply of liquid using a pressurized air actuated pump;

(d) creating a source of pressurized air to actuate the pump by causing the animal to walk through the pathway and across one of two opposite side walls of an inflatable mat and causing the weight of the animal to compress the mat and discharge pressurized air from the mat to the pump whereby liquid is dispensed from the dispensing conduit and onto the animal; and (e) moving the side walls of the mat away from one another when the animal leaves the pathway to create a vacuum in the mat and draw air into the mat though an air inlet opening.

18. A method of dispensing a liquid onto an animal as defined in claim 17, wherein the step of creating a source of pressurized air includes providing the inflatable mat with a plurality of adjacent compartments extending side by side in parallel longitudinal relationship to one another, moving the animal through the pathway in a direction perpendicular to the longitudinal axes of the compartments, causing the air within the inflatable mat to move in one direction through the plurality of compartments from a compartment adjacent one end of the inflatable mat to a compartment adjacent the other end of the mat having an air outlet opening therein.

19. An apparatus for dispensing liquid comprising:

(a) a conduit having at least one opening for dispensing liquid therefrom;

(b) a supply of liquid;

(c) a compressed air actuated pump connected to the liquid supply and to the dispensing conduit for pumping liquid from the liquid supply and into the dispensing conduit; and (d) a supply of compressed air for actuating the pump comprising a mat inflated with compressed air and having opposite side walls upon which an object can be placed and being comprised of at least one compartment, the mat having an air inlet through which compressed air can flow into the mat and a compressed air outlet connected to the pump, whereby compressed air can be introduced into the mat through the inlet opening and discharged from the mat through the outlet opening to actuate the pump, the compressed air within the mat urging the opposite side walls of the mat in a direction away from one another, whereby when the object is disposed on one of the side walls of the mat the weight of the object will cause the opposite side walls to move toward one another to force the compressed air through the air outlet to the pump to actuate the pump and discharge liquid from the dispensing conduit.

\* \* \* \* \*